Jan. 12, 1971  H. GEUL  3,554,022
ROLLER TESTING STAND FOR MOTOR VEHICLES
Filed Nov. 12, 1968  4 Sheets-Sheet 1
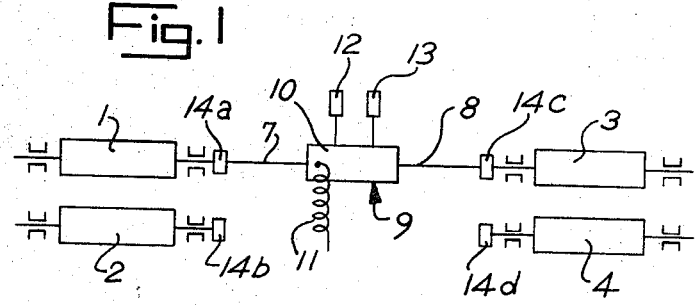
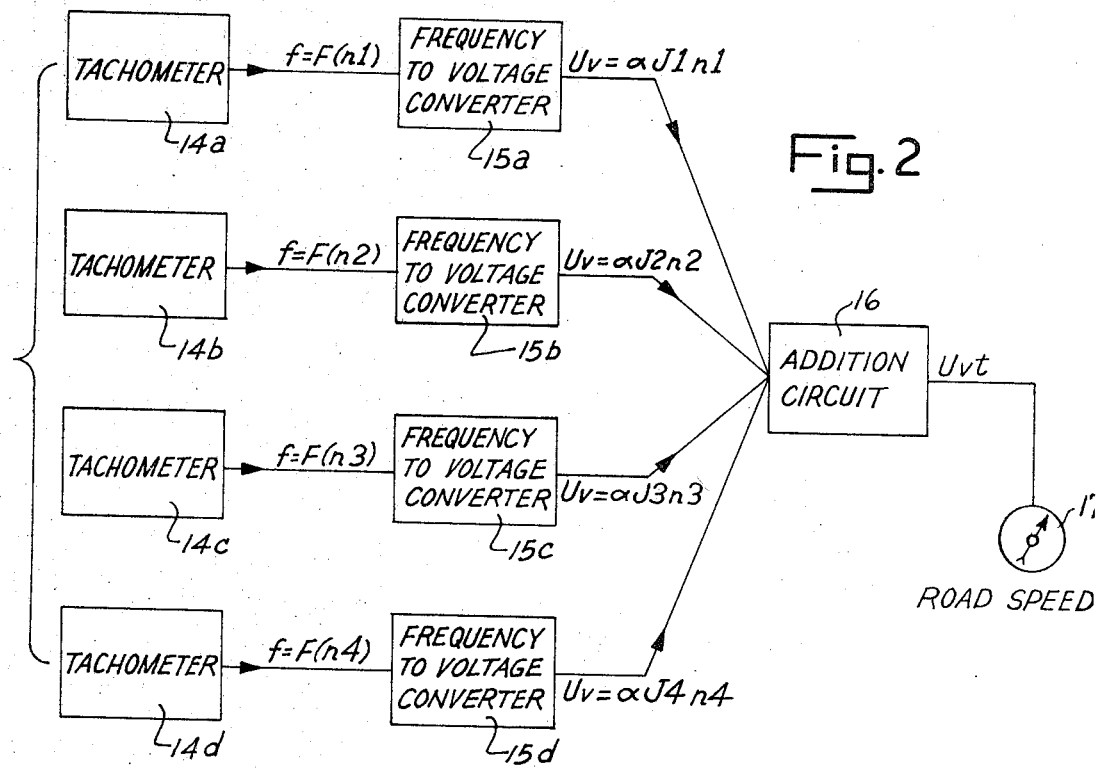
INVENTOR.
HERMAN R. GEUL
BY
ATTORNEYS Jan. 12, 1971    H. GEUL    3,554,022
ROLLER TESTING STAND FOR MOTOR VEHICLES
Filed Nov. 12, 1968    4 Sheets-Sheet 2
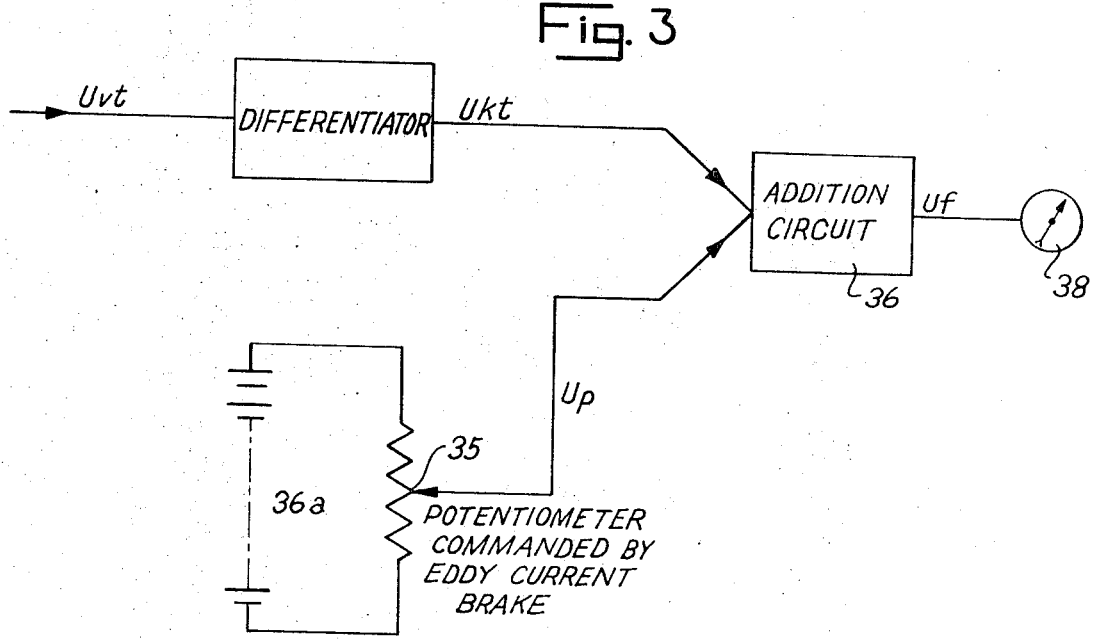
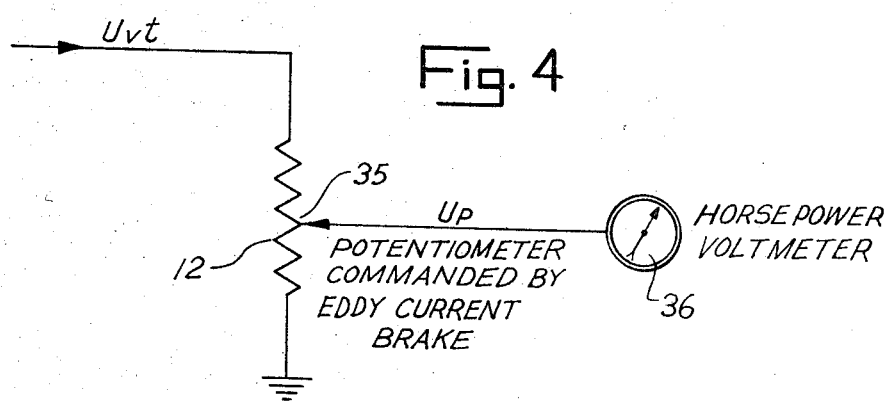
INVENTOR.
HERMAN R. GEUL
BY
*Bair, Freeman & Molinare*
ATTORNEYS

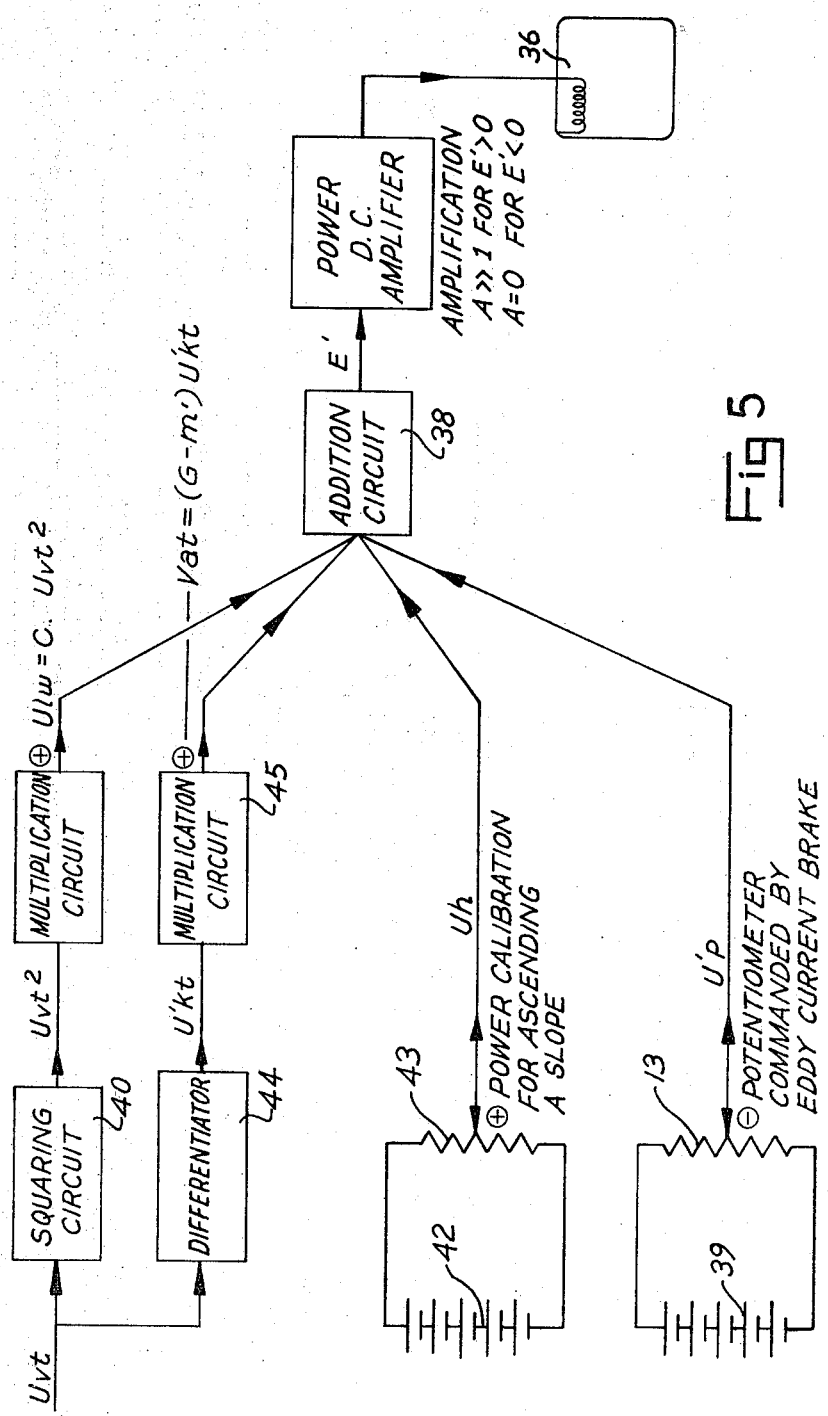

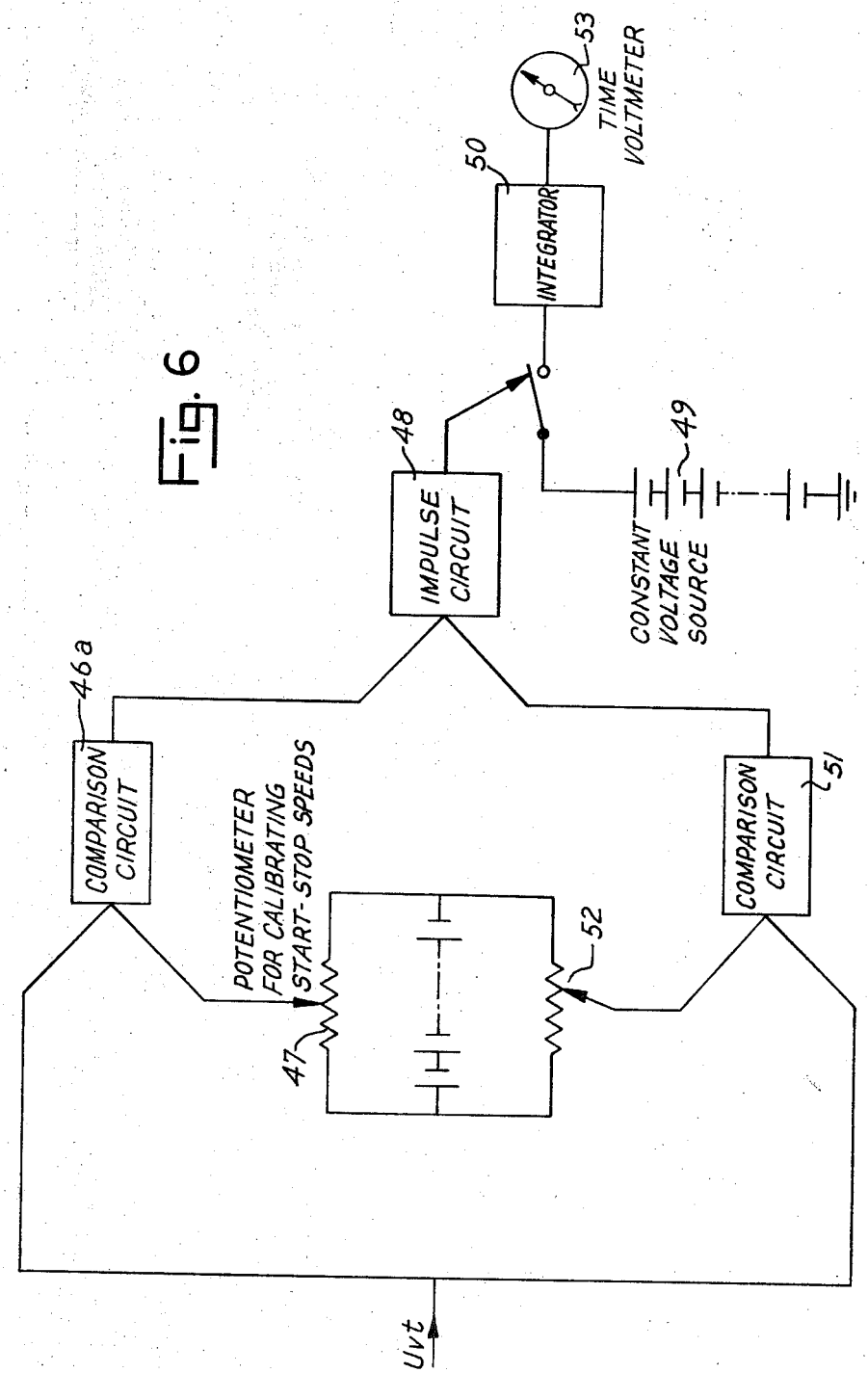

United States Patent Office 3,554,022
Patented Jan. 12, 1971

3,554,022
ROLLER TESTING STAND FOR MOTOR VEHICLES
Herman R. Geul, Leiden, Netherlands, (% Sun Electric (Nederland) N.V., Ariana Nozemanstraat 8, Amsterdam, Netherlands)
Filed Nov. 12, 1968, Ser. No. 774,806
Claims priority, application Netherlands, Nov. 14, 1967, 6715400
Int. Cl. G01l 5/13
U.S. Cl. 73—117         8 Claims

ABSTRACT OF THE DISCLOSURE

A roller testing stand for motor vehicles comprising a system of rotatably supported rollers for supporting the wheels of the vehicle to be tested and having an adjustable brake, which supplies a signal proportional to the braking effort, the rotatable rollers being coupled to respective tachometers for producing signals proportional to the velocity of the rollers, said velocity signals being differentiated and added to the signal representing the brake power to obtain an output signal representing the total pull exerted by the vehicle wheels.

BACKGROUND OF THE INVENTION

Roller testing stands of the general type mentioned above are known in the art. In such devices, the statical forces produced are measured by determining the canting of the brake, said brake often taking the form of a water brake or an eddy current brake.

Roller testing stands also are known in which the exerted pull is measured in a manner that a flywheel, coupled to the wheels, is set into motion, while the forces exerted for the acceleration of the rollers with the flywheel are measured.

The present improvement invention is based on the recognition that a specially exact and correct measurement, in which all circumstances prevailing in practice can be imitated and taken into account, can be obtained by measuring simultaneously both the static and the dynamic forces, and that the results may be totaled so that a proper and correct measurement of the pulling power, available on the wheels, can be obtained at any moment.

SUMMARY OF THE INVENTION

The roller testing stand improvement of the present invention is characterized in that the differentiated velocity signal, representing the accelerating and decelerating forces acting on the rollers, is added to the signal representing the brake power exerted by the brake in order to obtain an output signal representing the total pull on the wheels.

In one preferred embodiment of the invention, each roller system is coupled to a rotor of an eddy current type in which two rotors are influenced by a single magnetic field which is generated by a stator provided with an exciting winding. The stator is arranged so as to be capable of being rotated over a limited angle in opposition to the action of a spring and is coupled to the sliding contact of a potentiometer to which a reference voltage is fed. In such an eddy current brake, the two axles, when rotating with the same speed, are braked down by equal forces. In the event of a difference in speed, the rotor which is rotating faster experiences a greater brake power, whereby an effect is produced resulting in an equal velocity of the two rotors.

In the nonexcited condition of the eddy current brake, no coupling between the axles exists. This has the advantage that, when the roller testing stand is also used for testing the brakes of a vehicle, a complete disengaging of the axle from the rollers is obtained when the excitation of the eddy current brake is switched off. The construction of the roller testing stand is thereby considerably simplified.

It is advantageous when the exciting current of the eddy current brake is regulated by means of a regulating circuit to which is supplied a control signal representing the sum of an adjustable reference voltage and a direct current voltage of opposite sign, representing the number of revolutions of the motor of the vehicle to be tested, the arrangement being such that the eddy current brake is excited when the sum of the two signals exceeds a definite value. Due to this measure the constant number of revolutions of the eddy current brake is determined by the number of revolutions of the motor and the total transmission ratio. Therefore, it is possible to regulate the number of revolutions independent of the adjusted transmission ratio on a definite value without modifying the adjusted reference voltage. It further is possible to determine the transmission losses at various transmission ratios and to deduce therefrom the power available on the clutch of the vehicle.

The excitation of the eddy current brake is preferably regulated by means of a regulating circuit, the stator of the eddy current brake being coupled to the sliding contact of the potentiometer, fed by a reference voltage and the output voltage of which is added to one or more voltages, representing road conditions to be simulated, for the formation of a suitable controlling voltage for the regulating circuit of the eddy current brake.

Those skilled in the art will appreciate as the explanation proceeds that the invention makes it possible to simulate certain road conditions by means of simple regulating circuits, so that the inventive roller testing stand enables the user to obtain a true picture of the performance of the motor vehicle on the road.

The simulative voltage can be obtained by squaring, or almost squaring, the velocity signal and by multiplying the same by a factor representing the air resistance of the vehicle. In this way, the circumstances prevailing when the motor vehicle is running normally at a certain speed can be simulated.

The simulative voltage can also consist of an adjustable voltage for the purpose of imitating the counteracting force exerted on the vehicle on ascending a slope.

The simulative voltage can also be obtained by the differentiation of the speed signal and the multiplication thereof by a factor proportional to the difference between the weight of the vehicle and the transformed intertia moment of the rotating masses of the roller testing stand. Due to this feature, the circumstances prevailing when the vehicle accelerates can be imitated.

In accordance with a further feature of the invention, the roller testing stand is provided with an electronic timing circuit consisting of an integrating circuit fed by a fixed voltage and which is switched on by controlling signals supplied by reference circuits to which the signals representing the speed of the rollers are fed in response to an exceeding of an adjustable thereshold value.

BRIEF DESCRIPTION OF THE DRAWINGS

The various advantages, features and objects of the invention are further clarified by the following description given with reference to the accompanying figures, in which:

FIG. 1 is a diagrammatical plan view of an illustrative and representative roller testing stand according to the invention;

FIG. 2 is an overall block diagram illustrating a preferred embodiment of the electronic circuit utilized for determining the velocity of the rollers;

FIG. 3 is an illustrative diagram of a preferred embodiment of the circuits utilized for determining the pull of the wheels;

FIG. 4 is an illustrative diagram of a preferred circuit employed for determining the power absorbed by the eddy current brake;

FIG. 5 show a preferred circuit embodiment of the invention by means of which definite road conditions can be imitated; and FIG. 6 is a schematic diagram of an illustrative electronic timing clock.

The roller testing stand which is illustratively represented in FIG. 1 comprises four rollers 1, 2, 3 and 4. Rollers 1 and 2 are combined into a left roller pair, while the rollers 3 and 4 are combined into a right roller pair. The rollers 2 and 4 are supported for free rotation like the rollers 1 and 3. In addition, the rollers 1 and 3 are coupled to an eddy current brake 9 by means of the shafts 7, 8, respectively.

Advantageouly, in one embodiment of the invention, eddy current brake 9 is a specially constructed one which consists of a stator 10 with one exciting winding, fed by direct current and generating a magnetic field, and two rotors, each of which is coupled to the rollers 1 and 3, respectively, the two rotors rotating in the magnetic field generated by the stator 10. In operation, the two shafts are braked down with the same force, while in the unexcited condition no coupling exists between the shafts. This is very advantageous when the testing stand is provided with brake testing devices. The stator 10 of the eddy current brake 9 is adapted to cant through a definite angle in opposition to the action of one or more springs which are denoted by the reference numeral 11. This overturning movement is transmitted to the rotors of a number of potentiometers 12 and 13, respectively.

The advantage of the use of four rollers is that the vehicle to be tested is better fixed on the testing stand.

Each of the rollers 1, 2, 3 and 4 is connected to drive a tachometer feeder 14a to 14d, which may be of the photoelectric type. The tachometer feeders 14a to 14d generate an alternating voltage, the frequency of which is a function of the number of revolutions of the associated roller. As is apparent from FIG. 2, the output voltage of each tachometer feeder is supplied to a voltage transformer 15a to 15d, each supplying an output voltage which is not only proportional to the frequency $f$ of the tachometer signal concerned, and consequently of the number of revolutions $n$ of the associated roller, but also to a constant $\alpha$ and the mass inertia moment of the associated roller. Thus, for each voltage transformer the output voltage is $-Uv = (\alpha)(J)(n)$.

The four output voltages Uv are fed to an adding circuit 16, the output voltage of which is read by means of a voltmeter 17. The constant of proportion is selected in such a way that at an identical speed of the four rollers, the output voltage Uvt of the adding circuit 16 represents the circumferential speed of one roller. The voltmeter 17 is provided with a scale calibrated in units of road speed.

On accelerating and decelerating, respectively, a roller, the force acting upon the rollers is expressed by the equation $$K = J \frac{dv}{dt}$$

By recognizing that the output voltage of the voltage transformers 15a to 15d is dependent upon the inertia moment of the associated rollers, a signal, representing the acceleration, deceleration, respectively, is immediately obtained due to the differentiation of the output voltage of the associated transformers. It will be understood that it is also possible to introduce a differentiation factor representing the mass inertia moment.

The testing stand is provided with an eddy current brake 9 which preferably has a construction as hereinbefore described. This eddy current brake is used for measuring the pull which must be supplied by means of the wheels driven by the motor of the vehicle tested, and for determining the engine power.

As shown in FIG. 3, the canting of the stator 10 of the eddy current brake 9 is transmitted to the sliding contact 35 of the potentiometer 12, to which is fed a fixed voltage supplied by the voltage source 36a. The voltage derived from the sliding contact 35 is a measure for the canting of the stator 10 and therefore of the braking torque exerted by the eddy current brake 9 and, as a consequence, of the pull.

When the voltage Up of the potentiometer 35 is added in the adding circuit 36 to a voltage Ukt obtained from the differentiation circuit 37, to which the speed signal Uvt is supplied, an output voltage Uf is obtained, the amplitude of which can be indicated by the voltmeter 38. The latter is a direct measure for the total pull exerted by the wheels, as used in order to overcome the braking torque of the eddy current brake and to accelerate or decelerate the rollers.

The power on the driven wheels can likewise be ascertained by the aid of the roller testing stand. This power is expressed by the equation $P = Mw$ (in which P=power, M=torque and $w$=angular velocity) or $P = (F)(v)$. (F is pull, $v$=velocity). The power can be determined at any desired moment by keeping $w$ and $v$ respectively at a constant value, independently of the magnitude of M, F, respectively.

In order to satisfy the aforementioned condition, the excitation of the eddy current brake is controlled in a special way. As described hereinbefore, the position of the sliding contact of the potentiometer is a measure of the braking torque of the eddy current brake. When a voltage proportional to the speed signal Uvt is applied to the potentiometer 12, the output voltage of the potentiometer $Up = \beta Uvt(F')$, wherein $\beta$ is a constant of proportion and F' is a measure of the braking torque of the eddy current brake which is proportional to the canting of the brake and, as a consequence, to the position of the sliding contact of the potentiometer. When the speed of the rollers is constant, the pull F exerted by the wheels is equal to the braking torque F' and the output voltage of the potentiometer, which can be read by the aid of a voltmeter, is a measure for the power on the wheels.

FIG. 4 shows an illustrative diagram of the circuits used for this measurement. As shown in this figure, the velocity signal Uvt is fed to the potentiometer 12 and the sliding contact 35 of the potentiometer is connected to the voltmeter 36, the scale of which is calibrated in units of horsepower.

It is essential for the above mentioned measurement that the velocity of the eddy current brake remains constant. This can be achieved by imparting thereto a steep torque-speed characteristic. This may be effected in a known manner by feeding the eddy current brake through a direct current power amplifier to which is supplied the sum of the velocity signal Uvt and an adjustable reference voltage whereby, when the sum of these voltages exceeds zero, an amplification with a definite amplification factor is produced, and, when this sum is negative, no amplification is produced.

When, instead of the velocity signal Uvt, a signal Uvm representing the number of revolutions of the motor is compared with the adjusted reference voltage, an analogous regulation will be obtained in which the constant number of revolutions of the eddy current brake is determined by the number of revolutions of the motor and the total transmission ratio. Thus, it is possible to regulate the number of revolutions of the motor at a definite value independently of the chosen transmission ratio and without changing the adjusted reference voltage.

FIG. 5 shows how the roller testing stand of the present invention permits a relatively simply obtained simulation of road conditions. For that purpose, the exciting winding 36 of the eddy current brake is fed from a direct current amplifier 37. This amplifier is controlled by an adding circuit 38 to which is supplied a voltage U′p, taken from a potentiometer 13, the sliding contact of which is coupled to the stator of the eddy current brake and the resistance of which is connected across the voltage source 39. The voltage U′p produced on the sliding contact of the potentiometer 13 thus represents the force corresponding of the braking torque exerted by the eddy current brake.

This voltage U′p can be added with a number of "simulative voltages." In order to imitate the air resistance, a simulative voltage Ulw is generated which voltage is proportional to the square of the voltage representing the speed, and to a factor representing the air resistance of the vehicle and a factor representing the air density. The air resistance, experienced by a vehicle, is given by the formula $$Fs = (C)\left(\frac{P}{2}\right)(V^2)$$

In order to generate the voltage Ulw, the velocity signal Uvt is fed to a squaring circuit 40 and the output thereof is multiplied by a fixed factor in the multiplication circuit 41 to provide an output voltage $$Ulw = (C')(\phi)(U_{vt}^2)$$

which is fed to the summation circuit 38.

A measuring potentiometer 13, the sliding contact of which is controlled by the canting movement of the stator of the eddy current brake, is fed with a negative voltage of such a magnitude that the respective scale values correspond. The voltage on the sliding contact of the potentiometer 13 is again a measure for the force corresponding to the braking torque of the eddy current brake.

When in the electrical adding circuit 38, this negative voltage U′h is added to the positive voltage U′lw, and output voltage E′ is obtained. The latter is fed to the power D.C. amplifier 37 supplying the exciting current for the eddy current such that an exciting current will be sent through the eddy current brake, with output voltage E′ having the value corresponding to the output voltage required therefor and the amplification factor A concerned.

When the stator starts canting as a result of the excitation of the brake, the voltage U′h changes, which also influences the voltage E′ at the output of the adding circuit 38. In the case of a great amplification factor, E′ is a small (positive) voltage which means that U′h is almost equal to Ulw. Since U′h is a measure for the brake power exerted by the eddy current brake and Ulw is a measure for the air resistance, the exerted brake power is almost equal to the air resistance which the motorcar would experience in running on the road.

In order to simulate the resistance experienced on ascending a slope, the starting point is the fact that the force to be overcome thereby is independent of the speed of the vehicle and also of the accelerations or decelerations possibly produced. The magnitude of this force is determined by the weight of the motorcar and the percentage of slope and can be freely selected in principle. The simulation is effected in a manner analogous to that described with respect to the air resistance, provided that now it is not the total of U′p and Ulw that is applied to the power amplifier but the sum of U′p and an adjustable voltage Uh, the latter being adjusted by the potentiometer 43 fed by the voltage source 42, which is equivalent to the force to be selected. In an analogous way, the eddy current brake is again excited in such a way that U′p is almost equal to Uh so that also the braking force is equal to the adjusted force.

The simulation of the force required for the acceleration of the vehicle is effected on the basis of the following considerations. When the vehicle is accelerated by dv/dt, the force required therefor is $$Ka = \frac{G\frac{dv}{dt}}{10}$$

wherein G is the weight of the vehicle and the acceleration by the force of gravity is supposed to be 10 m./sec.² If the total inertia moment of the rotating systems on the basis of equivalent energies is transformed from rotation into translation, then for the rollers $m' = J/r^2$. If, via this transformation, the rollers should be accelerated by dv/dt this would require a force $$K_{am}' \frac{m'\frac{dv}{dt}}{10}$$

with g = 10 m./sec.²

If it is desired that the force required for acceleration of the vehicle on the road is to be measured with the roller testing stand, an additional braking force $$K_a \text{ brake} = \frac{(G - m.^1)}{10}\frac{dv}{dt}$$

should be introduced by means of the eddy current brake.

When the velocity signal Uvt is differentiated in a suitable way in the differentiating circuit 44, then $$U'kt = n\frac{dv}{dt}$$

in which n represents the required reduction factors.

The multiplication of this voltage U′kt in the multiplication circuit 45 with an adjustable factor (G − m′) provides $$U_{ak} = (G - m.')\frac{dv}{dt} n$$

Uak is now a measure for the supplementary force which should be supplied for the acceleration. When, in an analogous way as with respect to the regulation of the air resistance, U′fe and Uak are added and the result applied to the power amplifier then the eddy current brake will automatically provide for the required extra "inertia" on acceleration.

It is also possible to total simultaneously all the voltages obtained in this way and then $$E' = U'p + Ulw + Uh + Uah$$

Due to the control system U′h = Ulw + Uh + Uah; the road conditions like air resistance, slope and inertia of the motor car can be simultaneously simulated on the roller testing stand.

The roller testing stand is provided with an automatically controlled electronic timing clock. If it is desired to have an indication of the available power on the rear wheels in an extensive speed range (number of revolutions of the motor) without doing a series of measurements, then this can be effected by measuring the time required for bringing the vehicle from a certain low speed to a certain high speed under definite load conditions.

It is evident that this can be done by using a stopwatch and the speed indicator but in that case problems arise owing to inaccuracies in reading and the reaction times. The built-in automatic timing clock illustrated in FIG. 6 operates as follows: In an electronic reference circuit 46, two voltages are compared, viz., a variable voltage which is proportional to the circumferential speed of the rollers, such as the voltage Uvt, and a fixed voltage to be adjusted with the potentiometer 47, the latter voltage corresponding with an initial velocity to be chosen. As soon as the absolute value of Uvt exceeds the other voltage, the circuit sends an electrical impulse which switches an electromechanical or entirely electronic switch 48. Due to this switching a constant electrical voltage 49 of suitable amplitude is fed to an electronic integrator 50, which integrates this voltage to the time. In a second reference circuit 51, the voltage U*vt* is again compared with another voltage supplied by the potentiometer 52 and corresponding with a higher speed. This circuit also emits an electrical impulse as soon as the absolute value of U*vt* exceeds the other voltages, but this impulse resets the electronic switch 48, at which time the integration is stopped.

The output voltage of the integrator 50 is now proportional to the time which has lapsed between the two switching moments, thus proportional to the time between the moments at which the two adjusted velocities are exceeded and this voltage can be read by means of a voltmeter 53; said voltmeter can be provided with a scale calibrated in seconds.

The impulse switch 48 is further constructed in such a way that, after the switch has returned to the "off" position, it is no longer operated by electrical impulses before, by means of another circuit, a reset impulse has been given whereby simultaneously the output voltage of the integrator is again reduced to zero. The reference circuit and the switch controlled by the impulse are reversible so that it is also possible to measure the time between two selected velocities in the event of a decreasing speed, in which case the integrator 50 is started when the speed falls below the highest value and is stopped when it falls below the lowest value.

Advantageously, the reference circuits are constructed in such a way that the same result can be obtained by comparing a fixed reference voltage with a certain, adjustable fraction of the varying voltage U*vt'*.

The electrical adding, integrating, differentiating, squaring, multiplying, and reference circuits mentioned hereinabove are based on the use of operational amplifiers which are well known in the art, and particularly with respect to analog computers and the like. When these elements are used the circuits can be realized in a rather simple way and desired degree of exactitude can be easily attained.

While there has been described what at present is considered to be preferred embodiments of the invention, it will be obvious to those skilled in the art that various changes and modifications may be made therein without departing from the principles of the invention, and that the claims are intended to cover all such changes and modifications which fall within the true spirit and scope of the invention.

The embodiments of the invention in which the exclusive property or privilege is claimed are defined as follows:

1. A roller testing stand for motor vehicles comprising a system of rotatably supported rollers for supporting the wheels of the vehicles to be tested and a brake having adjustable brake power operatively coupled to such roller system wherein the improvement comprises means for enabling the brake to be canted through an angle in response to the rotation of the rollers and for producing a voltage signal corresponding to this canting and consequently to the brake power exerted by the brake, tachometer means coupled to the rollers for producing a signal which is dependent on the velocity of the rollers, means for producing a differentiated velocity signal representing the accelerating and decelerating forces acting on the rollers, and means for adding said differentiated velocity signal to the voltage signal representing the brake power exerted by the brake to provide an output signal representing the total pull on the wheels of the motor vehicle under test.

2. The improvement of a roller testing stand according to claim 1 wherein each roller system comprises a sliding contact of a potentiometer to which a reference voltage is fed, and wherein each roller system is coupled to a rotor of an eddy current brake, said eddy current brake comprising a stator having an exciting winding which generates a single magnetic field and further comprising two rotors that are influenced by said single magnetic field, said stator being arranged so as to be capable of being rotated through a limited angle in opposition to the action of a spring and being coupled to said sliding contact of said potentiometer.

3. The improvement of a roller testing stand according to claim 2 and further comprising a regulating circuit for regulating the exciting current of the eddy current brake, said regulating circuit being supplied with a control signal comprised of the sum of an adjustable reference voltage and a direct current voltage of opposite sign representing the number of revolutions of the motor of the vehicle to be tested, said regulating circuit being operative to excite the eddy-current brake when the sum of the two signals exceeds a definite value.

4. The improvement of a roller testing stand according to claim 2, said stand further comprising a regulating circuit for regulating the exciting current of the eddy current brake, and means for adding to the output voltage of the potentiometer one or more simulative voltages representing road conditions to be simulated, to provide a suitable controlling voltage for the regulating circuit of the eddy current brake.

5. The improvement of a roller testing stand according to claim 4 comprising means for obtaining the simulative voltage by substantially squaring said velocity signal and multiplying the same by a factor representing the air resistance of the vehicle.

6. The improvement of a roller testing stand according to claim 4 wherein said simulative voltage comprises an adjustable voltage for the purpose of simulating the counteracting force exerted on the vehicle on ascending a slope.

7. The improvement of a roller testing stand according to the claim 4 comprising means for obtaining said simulative voltage by the differentation of the speed signal and multiplication thereof by a factor proportional to the difference between the weight of the vehicle and the transformed inertia moment of the rotating masses of the roller testing stand.

8. The improvement of a roller testing stand according to claim 1 which further includes an electronic time circuit comprising an integrating circuit to which a fixed voltage is fed and comparison circuits having their output connected to the integrating circuit, said integrating circuit being switched on by controlling signals supplied by said comparison circuits to which signals, representing the speed of the roller, are fed in response to the surpassing of an adjustable threshold value.

References Cited

UNITED STATES PATENTS

| | | | |
|---|---|---|---|
| 2,685,199 | 8/1954 | Wlson et al. | 73—136X |
| 2,982,128 | 5/1961 | G ibson et al. | 73—117 |
| 3,057,192 | 10/1962 | Huffman et al. | 73—117 |
| 3,289,471 | 12/1966 | Maxwell | 73—117 |
| 3,375,712 | 4/1968 | Postma | 73—117.4 |

JERRY W. MYRACLE, Primary Examiner

U.S. Cl. X.R,

73—134